United States Patent
Kinlen et al.

(10) Patent No.: US 10,189,458 B2
(45) Date of Patent: Jan. 29, 2019

(54) THIOL BASED RESIN SYSTEM FOR REMOVAL OF COPPER IONS FROM HYDRAULIC FLUID

(71) Applicant: The Boeing Company, Chicago, IL (US)

(72) Inventors: Patrick J. Kinlen, Fenton, MO (US); Kelly L. Clark, Seattle, WA (US); Lauren A. Holden, Kirkland, WA (US); Michelle C. Halsted, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 843 days.

(21) Appl. No.: 14/619,924

(22) Filed: Feb. 11, 2015

(65) Prior Publication Data
US 2016/0229385 A1    Aug. 11, 2016

(51) Int. Cl.
*B60T 17/00* (2006.01)
*B60T 17/22* (2006.01)

(52) U.S. Cl.
CPC ............ *B60T 17/221* (2013.01); *B60T 17/00* (2013.01)

(58) Field of Classification Search
CPC ................. B60T 17/00; B60T 17/221
USPC ....................................................... 210/500.1
See application file for complete search history.

(56) References Cited

U.S. PATENT DOCUMENTS

| 2004/0014614 | A1* | 1/2004 | Burrington | .......... C10M 165/00 508/287 |
| 2013/0167431 | A1* | 7/2013 | West | .................. C10L 1/19 44/400 |

OTHER PUBLICATIONS

Soeriyadi, Alexander H. et al., Modification of Porous Silicon Rugate Filters through Thiol-yne Photochemistry, 5th Nanoscience and Nanotechnology Symposium, AIP Conference Proceedings, 2014, pp. 35-38, AIP Publishing LLC, Melville, United States.
Hydraulic Oil Filters—Grainger Industrial Supply, pp. 1-6, retrieved Jan. 27, 2015, <http://www.grainger.com/category/ecatalog/N-1z0dlg5?perPage=32&requestedPage=2>.

* cited by examiner

*Primary Examiner* — Taiwo Oladapo
(74) *Attorney, Agent, or Firm* — Patterson + Sheridan, LLP

(57) ABSTRACT

System and method for removing copper species from a hydraulic fluid are described. The system includes a filter including a thiol resin. The filter is configured to be in fluid communication with the hydraulic fluid of the hydraulic system.

8 Claims, 3 Drawing Sheets

THIOL BASED RESIN SYSTEM FOR REMOVAL OF COPPER IONS FROM HYDRAULIC FLUID

FIELD

A system and method for removing copper species from hydraulic fluid is disclosed.

BACKGROUND

Components of hydraulic systems are plagued with plating-induced damage from contaminants present in hydraulic fluid. Such components must be replaced once damaged. The source of the plating-induced damage is poorly understood because the contaminants are present at low concentrations in the circulating hydraulic fluid of most systems.

Thus, a need exists to reduce the concentration of contaminants present in hydraulic systems.

BRIEF SUMMARY

In a first aspect, a modified silica resin system for removing copper species from a hydraulic fluid in a hydraulic system is described. The system includes a filter having a thiol resin. The filter is in fluid communication with the hydraulic fluid of the hydraulic system.

In a second aspect, a method for removing copper species from a hydraulic fluid is described. The method includes the step of contacting the hydraulic fluid with a thiol resin to form a mixture. The mixture undergoes reaction to generate a thiol resin-Cu[I] product; free copper species are thereby removed from the hydraulic fluid.

In a third aspect, a method for removing copper species from a hydraulic fluid is described. The method includes a step of contacting the hydraulic fluid with a thiol resin to form a mixture, wherein the mixture undergoes reaction to generate a thiol resin-Cu[I] product and hydraulic fluid depleted of copper species. The thiol resin comprises a thiol compound of structure (2):

L-SH     (2), wherein L is a covalent bond or a divalent moiety.

These and other features, objects and advantages will become better understood from the description that follows.

BRIEF DESCRIPTION OF THE DRAWINGS

The features, objects and advantages other than those set forth above will become more readily apparent when consideration is given to the detailed description below. Such detailed description makes reference to the following drawings.

DETAILED DESCRIPTION

Figure 1:
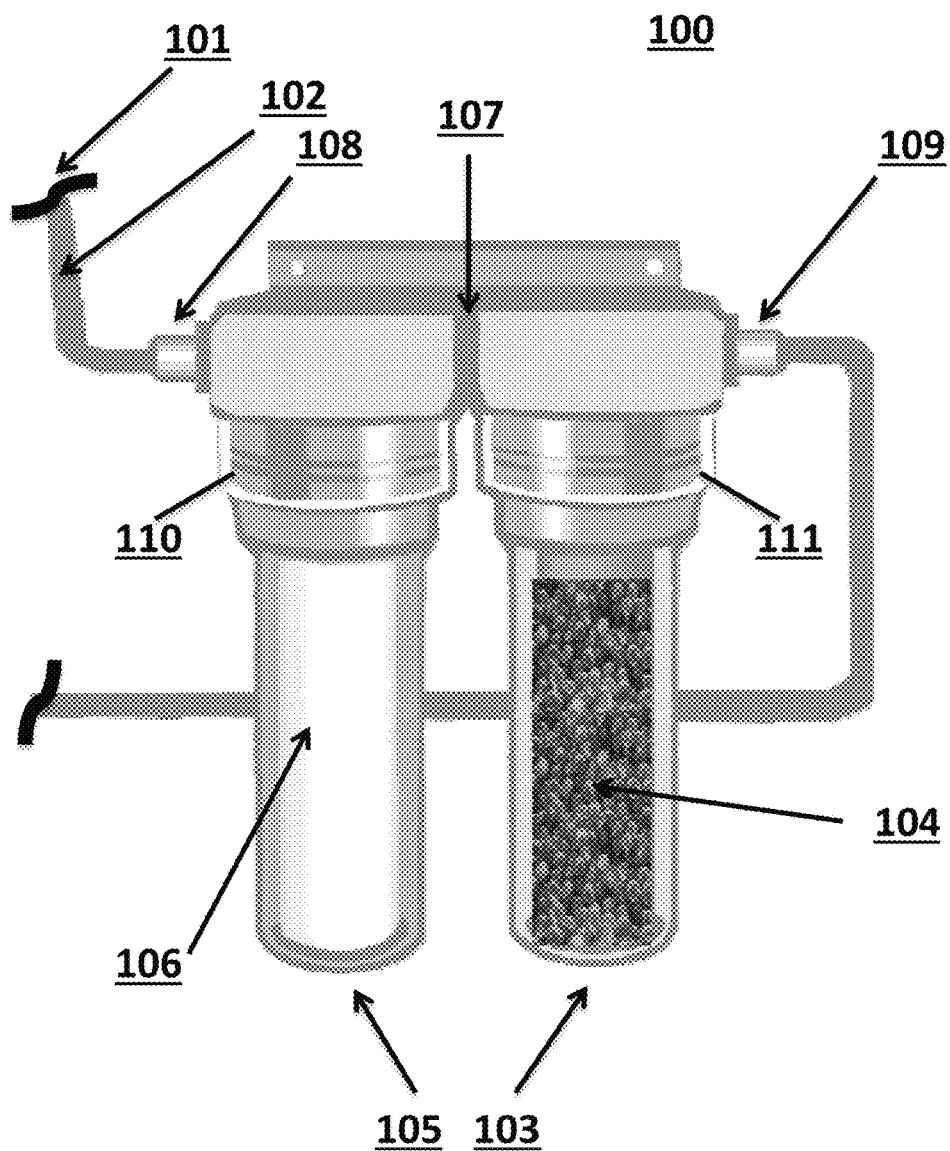
FIG. 1 shows an exemplary aspect of a system presented in the disclosure.

Certain terms are first defined. Additional terms are defined throughout the specification.

Terms used herein are intended as "open" terms. As used herein, open terms, such as "comprise," "include" and "have" are used interchangeably throughout the specification.

The verb forms of "comprise," "have" and "include," have the same meaning as used herein. Likewise, the verb forms of "describe", "disclose" and "provide" have the same meaning as used herein.

As used herein, the articles "a," "an" and "the" refer to one or more than one (for example, to at least one) of the grammatical object of the article. Accordingly, the singular forms "a," "an" and "the" include plural form unless the context clearly dictates otherwise.

"About" and "approximately" shall generally mean an acceptable degree of error for the quantity measured given the nature or precision of the measurements. Exemplary degrees of error are within 25 percent (%), typically, within 10%, and more typically, within 5% of a given value or range of values.

As used herein, "or" is used interchangeably with, the term "and/or", unless context clearly indicates otherwise. The use of the term "and/or" in some places herein does not mean that use of the term "or" is not interchangeable with the term "and/or" unless the context clearly indicates otherwise.

All language such as "from," "to," "up to," "at least," "greater than," "less than," and the like, includes the number recited and refers to ranges that can subsequently be broken down into sub-ranges as the context warrants.

A range includes each individual member. Thus, for example, a group having 1-3 members refers to groups having 1, 2, or 3 members. Similarly, a group having 6 members refers to groups having 1, 2, 3, 4, 5 or 6 members, and so forth.

The term "alkyl" embraces a linear or branched acyclic alkyl radical containing from 1 to about 15 carbon atoms. In some embodiments, alkyl is a $C_{1-10}$ alkyl, $C_{1-6}$ alkyl or $C_{1-3}$ alkyl radical. Examples of alkyl include, but are not limited to, methyl, ethyl, propyl, isopropyl, butyl, isobutyl, tert-butyl, sec-butyl, pentan-3-yl (i.e.,

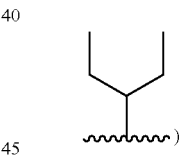

)

and the like.

The term "alkenyl" refers to an unsaturated, acyclic hydrocarbon radical with at least one double bond. Such alkenyl radicals contain from 2 to about 15 carbon atoms. Non-limiting examples of alkenyl include ethenyl (vinyl), propenyl and butenyl.

The term "alkynyl" refers to an unsaturated, acyclic hydrocarbon radical with at least one triple bond. Such alkynyl radicals contain from 2 to about 15 carbon atoms. Non-limiting examples of alkynyl include ethynyl, propynyl and propargyl.

The term "amido" embraces amino attached to a parent molecular scaffold through carbonyl (e.g.,

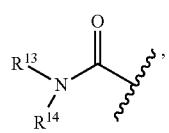

, where $R^{13}$ and $R^{14}$ may be (independently), for example, H, alkyl, aryl or heteroaryl). The terms "amido", "carboxamido" and "aminocarbonyl" may be used interchangeably.

The term "aminoalkyl" embraces an amino radical attached to a parent molecular scaffold through an alkyl radical (e.g., $NH_2$-alkyl-scaffold).

The term "dialkylamino" embraces two alkyl radicals attached to a parent molecular scaffold through a single amino group (e.g.,

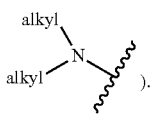

A specific non-limiting example of dialkylamino is N,N-dimethylamino.

The term "aryl" refers to any monocyclic, bicyclic or tricyclic cyclized carbon radical, wherein at least one ring is aromatic. An aromatic radical may be fused to a non-aromatic cycloalkyl or heterocyclyl radical. Examples of aryl include phenyl and naphthyl.

The term "carbonyl" denotes a carbon radical having two of four covalent bonds shared with a single oxygen atom (e.g.,

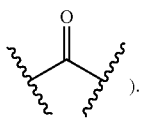

The term "copper species" refers to Cu, Cu[I] or Cu[II], including any combination thereof.

The term "cycloalkyl" refers to a cyclic alkyl radical containing from 3 to about 15 carbon atoms. Examples of cycloalkyl include cyclobutyl, cyclopentyl and cyclohexyl.

The term "ester" refers to a chemical group wherein a carbonyl is adjacent to an oxygen atom. The ester group may be represented by the formula —COOR, wherein R is an alkyl group.

The term "heterocycloalkyl" refers to a cycloalkyl that includes replacement of at least one carbon with a corresponding number non-carbon atoms, such as sulfur, oxygen or nitrogen, or a combination thereof. Examples of heterocycloalkyl include thiolanyl, piperidyl and morpholino.

The term "heteroaryl" refers to an aryl that includes replacement of at least one carbon with a corresponding number of non-carbon atoms, such as sulfur, oxygen or nitrogen, or a combination thereof. Examples of heteroaryl include furanyl, pyridyl and thiadiazolyl.

The terms "sulfide" and "thioether" refer to compounds having an $R^1$—S—$R^2$ structure, where neither $R^1$ nor $R^2$ is hydrogen. Examples of sulfide include dimethylsulfide, ethyl phenyl sulfide and 2-mercaptoethyl ethyl sulfide.

The term "sulfonyl" refers to an —S(=O)$_2$— divalent radical. Examples of sulfonyl include methanesulfonyl, p-toluenesulfonyl and 5-(dimethylamino)naphthalene-1-sulfonyl.

The terms "sulfhydryl" and "thiol" refer to an —SH radical. Examples of sulfhydryl or thiol include 2-mercaptoethyl, propanethiol and cyclopentanethiol.

The terms "thio-containing resin," "thio-functionalized resin," "thio-modified resin," "thiol-containing resin," "thiol-functionalized resin," "thiol-modified resin" and "thiol resin" have the same meaning as used herein and refers to a resin that is covalently bonded to a thiol.

The term "insoluble" refers to a compound solute forming a cloudy dispersion or sediment-containing mixture for mixtures containing 5 g solute in 1 kg solvent.

As used herein, "fluid communication" refers to discontinuous transfer of at least a portion of fluid medium between one or more systems, subsystems or modules. Examples of discontinuous transfer include on-line hyphenation, isolated retention loops and volumetric holding cells.

The chemical structures described herein are named according to IUPAC nomenclature rules and include art-accepted common names and abbreviations where appropriate. The IUPAC nomenclature can be derived with chemical structure drawing software programs, such as ChemDraw® (PerkinElmer, Inc.), ChemDoodle® (iChemLabs, LLC) and Marvin (ChemAxon Ltd.). The chemical structure controls in the disclosure to the extent that an IUPAC name is misnamed or otherwise conflicts with the chemical structure disclosed herein.

Headings, for example, (a), (b), (i) etc., are presented merely for ease of reading the specification and claims. The use of headings in the specification or claims does not require the steps or elements be performed in alphabetical or numerical order or in the order that they are presented.

Compositions

Applicants made the insightful discovery that an increased concentration of copper ions can be present in hydraulic fluid of hydraulic fluid systems. This disclosure describes compositions and methods to remove copper ions from these systems.

Compositions for removing copper ions from hydraulic fluid are described. A thiol functionalized resin can react with Cu[II] ions (that is, $Cu^{2+}$) in a hydraulic fluid after the resin and fluid contact. The reaction of the thiol resin with Cu[II] ions can be described by Eqn. 1:

$$\text{Resin-SH} + Cu^{++} \rightarrow \text{Resin-S}-Cu^+ + H^+ \quad \text{(Eqn. 1)}$$

Nanoparticles of copper species, if present, may also react with the thiol on the resin. By reducing the copper species content of the fluid in hydraulic systems, the amount and rate of copper species deposited on the components in fluid communication with hydraulic systems are similarly reduced.

Systems

Referring to FIG. 1, a system for removing copper species from a hydraulic fluid is disclosed. The system (100) includes a hydraulic system (101) having a hydraulic fluid (102), and a filter (103) that includes a thiol resin (104). Filter (103) is in fluid communication with the hydraulic fluid (102) of the hydraulic system (101).

In a first aspect, the thiol resin comprises structure (1):

$$\text{X-L-SH} \quad (1),$$

wherein:
X comprises a support; and
L is a covalent bond or a divalent moiety.

The support comprises at least one of a particle, a bead, a paper or a membrane. In some aspects, the support can include an inorganic support, organic support or a metal-organic support. In those aspects where the support includes an inorganic support, the inorganic support may comprise, for example, $SiO_2$, $TiO_2$, $ZnO$ and $Al_2O_3$, or any combination thereof. In those aspects where the support includes an organic support, the organic support may comprise, for example, a thermoplastic resin. In those aspects where the support includes a thermoplastic resin, the thermoplastic resin may comprise, for example, a polyvinyl polymer, a polyurethane polymer, an acrylate polymer, and a styrene polymer, or any combination thereof. In those aspects where the support includes a metal-organic support, the metal-organic support may comprise, for example, a metal organic framework, such as $Cd(4,4'\text{-bipyridine})_2(NO_3)_2$. In some of the foregoing aspects, the support can be nonporous.

Figure 2:
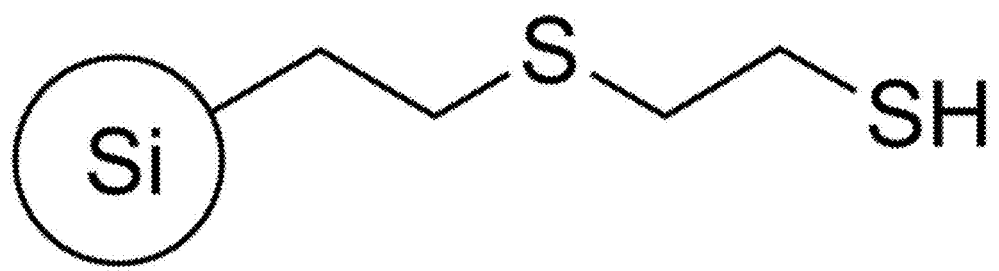
FIG. 2 depicts an exemplary thiol resin of the disclosure.

Referring again to the thiol resin of structure (1), L is selected from a group consisting of: alkyl, alkenyl, alkynyl, amino, amido, sulfonyl, sulfhydryl, sulfide, carbonyl, ester, aryl, heteroaryl, cycloalkyl and heterocycloalkyl. Where necessary, the chemical radicals included in L may be divalent, trivalent or higher valency to fulfill valency requirements of the relevant radical. In some aspects, L includes diethyl sulfide, wherein the thiol resin of structure (1) includes L-SH having 2-mercaptoethyl ethyl sulfide. In some aspects where X includes a silica particle, the thio resin of structure (1) includes 2-mercaptoethyl ethyl sulfide silica particles (see FIG. 2). One having ordinary skill in the art will appreciate that preparing a thio resin of structure (1) results in a product having a statistical distribution of functionalized X groups. For some aspects, for example, some X groups can include a plurality of thio groups per particle. Such silica particles can be 45 microns or larger; commercial suppliers of such silica particles have available particle sizes in the range from 45 microns to 500 microns (see, for example Sigma-Aldrich Co. LLC (St. Louis, Mo. [US]) and PhophonicS Ltd. (Abingdon, [UK])).

In some aspects, the thiol resin of structure (1) includes L-SH having a soluble or partially soluble form of a thiadiazole compound. Exemplary thiadiazole compounds include structures (I) and (II):

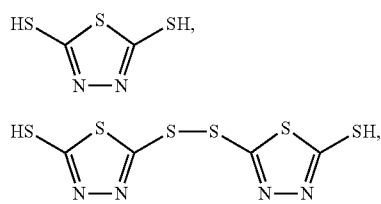

or a combination thereof.

The thiadiazole compounds having structure (I) or (II) are available from commercial sources. For example, Vanlube 829 represents a commercial lubricant additive of compound (II) (Vanderbilt Chemicals, LLC (Norwalk, Conn. (US)).

In a second aspect, the thiol resin comprises a thiol compound of structure (2):

L-SH       (2), wherein:

L is a covalent bond or a divalent moiety.

In this aspect, the thiol compound of structure (2) is an insoluble particulate in a hydraulic fluid. In this regard, the thiol resin comprising a thiol compound of structure (2) can differ from the thiol resin comprising structure (1) with respect to an X moiety comprising a support being absent in the thiol resin comprising a thiol compound of structure (2). An X moiety comprising a support is not strictly required in a thiol resin comprising a thiol compound of structure (2) owing to the insoluble particulate nature of thiol compound of structure (2). For some respects, however, a thiol resin comprising a thiol compound of structure (2) can include an X moiety comprising a support of the type described supra for thiol resins comprising structure (1). In these latter respects, the presence of an X moiety comprising a support in thiol resins comprising thiol compounds of structure (2) may facilitate enclosing such thiol resins in an appropriate housing, such as a filter housing.

In some respects, the thiol compound of structure (2) is a thiadiazole compound. In these respects, the thiadiazole compound include structures (III)-(V):

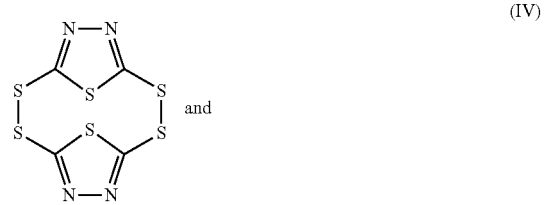 [SMILES: N1=C2SSc3nnc(s3)SSC(=N1)S2]

and

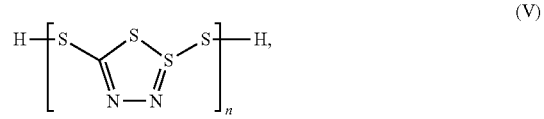

or a combination thereof, wherein n of structure (V) is equal to or greater than 2.

In some respects, the thiadiazole compound includes a compound of structure (III):

In other respects, the thiol compound of structure (2) is a metal-containing thiadiazole compound. In these respects, the metal-containing thiadiazole compound includes 2,5-dimercapto-1,3,4-thiadiazole, dipotassium salt; poly[Zn:2,5-dimercapto-1,3,4-thiadiazole (1:1)]; [Al:2,5-dimercapto-1,3,4-thiadiazole (1:3)]; [Al:2,5-dimercapto-1,3,4-thiadiazole (3:1)]; poly[Zn:(bis-(2,5-dithio-1,3,4-thiadiazole) (1:1)]; poly[Fe:2,5-dimercapto-1,3,4-thiadiazole) (1:1)]; poly[Al:2,5-dimercapto-1,3,4-thiadiazole (1:1)]; and poly[Cu:2,5-dimercapto-1,3,4-thiadiazole (1:1)]; or a combination thereof. In yet other respects, the metal-containing thiadiazole compound is poly[Zn:2,5-dimercapto-1,3,4-thiadiazole (1:1)].

System (100) can also include an optional filter (105) in fluid communication with the hydraulic fluid (102) of the hydraulic system (101). Optional filter (105) can include a mesh (106) having a suitable cutoff to remove particulates larger than a specified size. Exemplary cutoffs for the mesh (106) include cutoffs having 5 micron, 10 micron, 50 micron and 100 micron sizes, among others. Generally, optional filter (105) lies upstream of filter (103) in most aspects of system (100) of FIG. 1. The advantage to this arrangement is that optional filter (105), where included, provides a prefiltration step where particulates that might otherwise interfere with the performance of filter (103) are effectively removed from the hydraulic fluid before the hydraulic fluid contacts the thiol resin (104) of filter (103).

Filters (103) and (105) can further include a housing (107). Housing (107) includes an inlet (108) and an outlet (109). Inlets (108) and outlets (109) are in fluid communication with the hydraulic fluid (102) of the hydraulic system (101). Housing (107) can further include fittings (110) and (111) to enable independent replacement of filters (103) and (105). In some aspects, filters (103) and (105) can be configured in separate housings, wherein each separate housing includes discrete inlets and outlets (not shown in FIG. 1).

Methods

In another aspect, a method for removing copper species from a hydraulic fluid is disclosed. The method includes the step of contacting the hydraulic fluid with a thiol resin to form a mixture, wherein the mixture undergoes reaction to generate a thiol resin-Cu[I] product and hydraulic fluid depleted of copper species. The method can further include the additional step of separating the hydraulic fluid depleted of copper species from the thiol resin and the thiol resin-Cu[I] product. When both the aforementioned steps of the method are practiced, the steps are conducted on hydraulic fluid flowing in a hydraulic system in fluid communication with a filter housing that includes the thiol resin. In practice, both the thiol resin and the thiol resin-Cu[I] product are retained within the filter housing.

Figure 3:
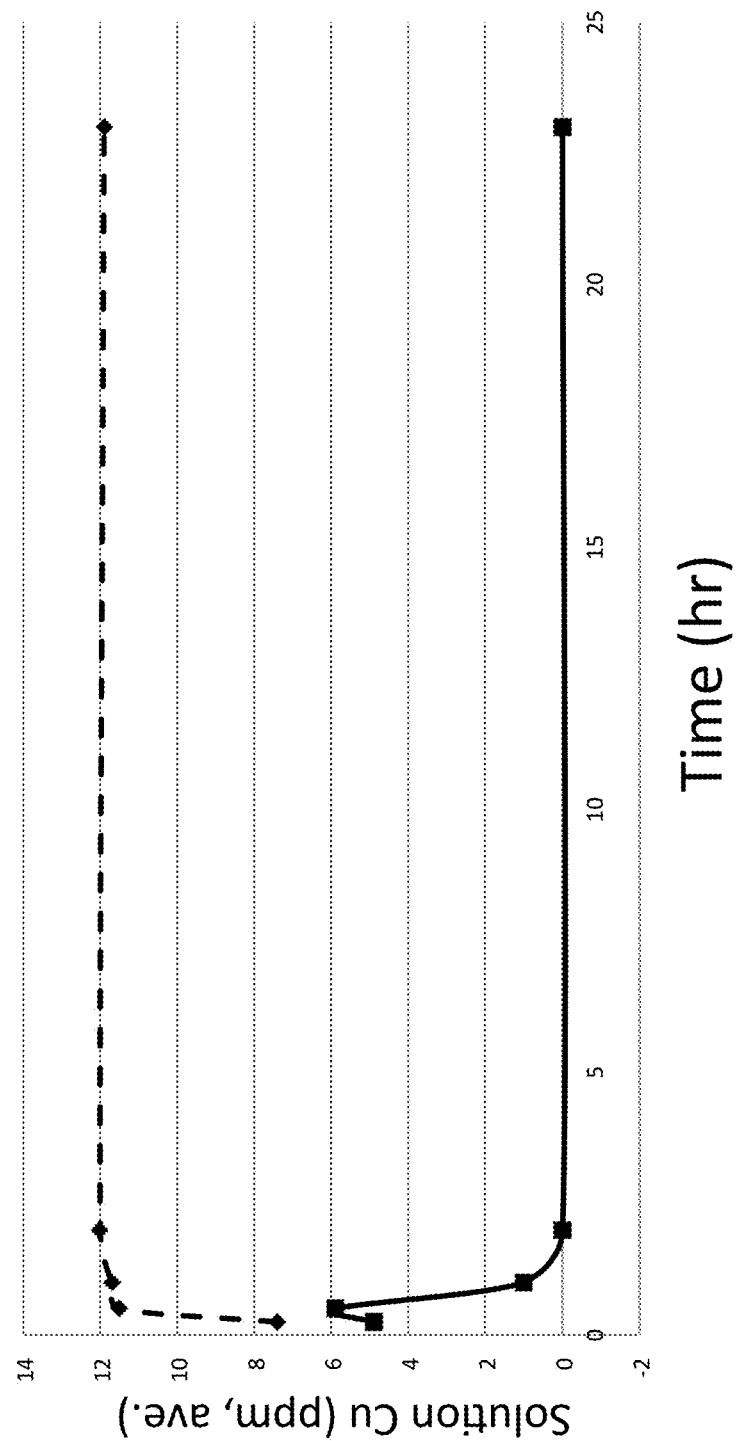
FIG. 3 depicts an exemplary plot of copper ion content removal over time for LD-4 hydraulic fluid containing an initial concentration of copper (II) acetylacetate (10 ppm) following exposure of LD-4 hydraulic fluid to 2-mercaptoethyl ethyl sulfide silica (squares, solid line) or control LD-4 hydraulic fluid lacking a silica compound (diamonds, dashed line).

The thiol resin includes compounds having structure (1) as described supra. The thiol resin includes all of the foregoing aspects discussed above, including 2-mercaptoethyl ethyl sulfide silica beads. Referring to FIG. 3, 2-mercaptoethyl ethyl sulfide silica depleted Cu(II) ions from LD-4 hydraulic fluid by at least 10-fold as compared to control LD-4 hydraulic fluid lacking the silica compound.

In another aspect, a method for removing copper species from a hydraulic fluid is disclosed. The method includes a step (a) of contacting the hydraulic fluid with a thiol resin to form a mixture, wherein the mixture undergoes reaction to generate a thio resin-Cu[I] product and hydraulic fluid depleted of copper species. The thiol resin includes a thiol compound of structure (2):

L-SH    (2), wherein L is a covalent bond or a divalent moiety.
The thiol compound of structure (2) is an insoluble particulate in the hydraulic fluid.

In some respects, the method further includes a step (b) of separating the hydraulic fluid depleted of copper species from the thiol resin and the thiol resin-Cu[I] product. In some respects, the methods having steps (a) and (b) are conducted on hydraulic fluid flowing in a hydraulic system in fluid communication with a filter housing including the thiol resin. In these some of these respect, the thiol resin and the thiol resin-Cu[I] product are retained within the filter housing.

In some respects, the thiol compound of structure (2) is a thiadiazole compound. For example, the thiadiazole compound includes structures (III)-(V):

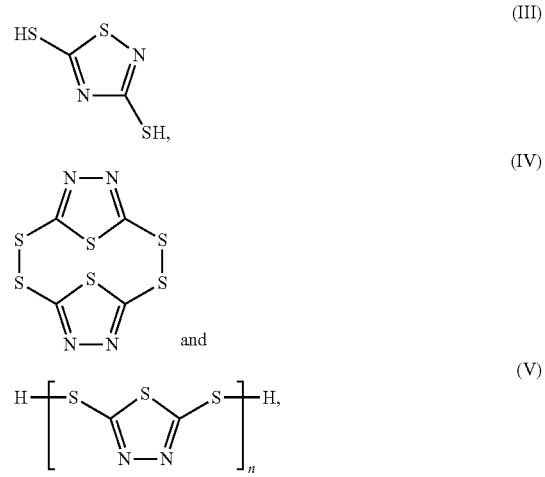

or a combination thereof, wherein n of structure (V) is equal to or greater than 2.

In some respects, the thiadiazole compound is a compound of structure (III):

In other respects, the thiol compound of structure (2) is a metal-containing thiadiazole compound. For example, metal-containing thiadiazole compound includes 2,5-dimercapto-1,3,4-thiadiazole, dipotassium salt; poly[Zn:2,5-dimercapto-1,3,4-thiadiazole (1:1)]; [Al:2,5-dimercapto-1,3,4-thiadiazole (1:3)]; [Al:2,5-dimercapto-1,3,4-thiadiazole (3:1)]; poly[Zn:(bis-(2,5-dithio-1,3,4-thiadiazole) (1:1)]; poly[Fe:2,5-dimercapto-1,3,4-thiadiazole) (1:1)]; poly[Al:2,5-dimercapto-1,3,4-thiadiazole (1:1)]; and poly[Cu:2,5-dimercapto-1,3,4-thiadiazole (1:1)]; or a combination thereof. In some respects, the metal-containing thiadiazole compound is poly[Zn:2,5-dimercapto-1,3,4-thiadiazole (1:1)].

Synthesis of Thiol Compounds of Structure (2)

Certain thiol compounds of structure (2) include commercially available thiadiazole compounds selected from a group consisting of structures (III) and (VI), as shown in Table 1.

TABLE 1

Exemplary commercially available thiadiazole compounds.

| Compound | Structure | IUPAC Name [CAS No.] |
|---|---|---|
| III |  | 1,2,4-Thiadiazole-3,5-dithiol [20939-17-7] |
| VI | KS–⟨S,N–N⟩–SK | 1,3,4-Thiadiazole-2,5-dithiol, dipotassium salt [4628-94-8] |

The following thio compounds of structure (2) include known thiadiazole compounds (IV) and (V) that can be synthesized from oxidation of compound (I) under appropriate conditions, as shown in Table 2.

TABLE 2

Exemplary thiadiazole compounds.

| Compound | Structure and IUPAC Name | Citation for Synthesis |
|---|---|---|
| IV | Bis-[2,5-dithio-1,3,4-thiadiazole] | Hugo et al. US4599425A (1986) (see also Example 3(a)) |
| V | poly-(2,5-dithio-1,3,4-thiadiazole), (n ≥ 2) | E. Ziegele, J. Prakt. Chem. 60:40 (1899) (see also Example 3(b)) |

The following thiol compounds of structure (2) include novel metal thiadiazole compounds (VII)-(XIII) that can be synthesized according to the particular examples disclosed herein, as shown in Table 3.

TABLE 3

Exemplary metal thiadiazoles.

| Compound | Predicted Structure[a] and IUPAC Name | Synthesis Example |
|---|---|---|
| VII | poly[Zn:2,5-dimercapto-1,3,4-thiadiazole (1:1)], (n ≥ 2) | Example 3(c) |
| VIII | [Al:2,5-dimercapto-1,3,4-thiadiazole (1:3)] | Example 3(d) |
| IX | [Al:2,5-dimercapto-1,3,4-thiadiazole (3:1)] | Example 3(e) |
| X | poly[Zn:(bis-(2,5-dithio-1,3,4-thiadiazole) (1:1)], (n ≥ 2) | Example 3(f) |
| XI | poly[Fe:2,5-dimercapto-1,3,4-thiadiazole) (1:1)], (n ≥ 2) | Example 3(g) |
| XII | poly[Al:2,5-dimercapto-1,3,4-thiadiazole (1:1)], (n ≥ 2) | Example 3(h) |
| XIII | poly[Cu:2,5-dimercapto-1,3,4-thiadiazole (1:1)], (n ≥ 2) | Example 3(i) |

[a]Predicted structure is based upon considerations of molar ratios of synthetic reagents, not upon analytical characterization of the resultant product of synthesis.

EXAMPLES

Example 1. Materials and Methods

Skydrol® LD-4 hydraulic fluid was obtained from Eastman Chemical Co. (Kingsport, Tenn. [US]). 2-Mercaptoethyl ethyl sulfide silica (≥45 micron particle size) and copper (II) acetylacetate was obtained from Sigma-Aldrich Co. LLC (St. Louis, Mo. [US]). Silica, toluene, (3-mercaptopropyl)-trimethoxysilane, 3-chloro-1-propanethiol and related reagents can be obtained from Sigma-Aldrich Co. LLC (St. Louis, Mo. [US]).

Example 2. Representative Syntheses of Suitable Thiol Resins Comprising Structure (1)

Silica-Based Resins—Exemplary Coupling Protocols.
(a) Thioalkylsilane-Containing Linker Moieties.
Dried silica (0.2 mm to 60 mm) (10 g) is dispersed in anhydrous toluene (200 ml). To this slurry, an appropriate thioalkylsilane (for example, (3-mercaptopropyl)trimethoxysilane (6.6 g (0.03 mol))) is added. The resulting mixture is refluxed for 6 h and then cooled to room temperature. The final product is filtered, washed with toluene and methanol, dried in vacuum at 120° C. for a further period of 12 h and kept in a desiccator for further use.
(b) Thioalkyl-Containing Linker Moieties.
Dried silica (0.2 mm to 60 mm) (10 g) is dispersed in anhydrous toluene (200 ml). To this slurry, an appropriate thioalkylhalide (for example, (3-chloro-1-propanethiol (3.3 g (0.03 mol))) is added. The resulting mixture is refluxed for 6 h and then cooled down. The final product is filtered, washed with toluene and methanol, dried in vacuum at 120° C. for a further period of 12 hours and kept in a desiccator for further use.

Example 3. Representative Syntheses of Suitable Thiol Resins Comprising Compounds of Structure (2)

(a) Synthesis of Bis[2,5-dithio-1,3,4-thiadiazole] (IV)

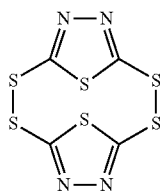

(IV)

Fifteen grams of DMcT (0.1 mole) in the form of a powder was suspended in 200 ml of water at 0° C. While vigorously stirring the suspension, 30% hydrogen peroxide solution (14 g (0.1 mole)) was added drop wise (using the peristaltic pump) at a slow rate such that the reaction temperature did not exceed 50° C. One hour after the addition of the peroxide, the BDTD product was filtered off, washed three times with deionized water, and dried at 50° C. for 12 hr.

(b) Synthesis of poly-(2,5-dithio-1,3,4-thiadiazole) (V)

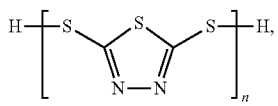

(V)

Twenty-two grams of dipotassium 1,3,4-thiadiazole-2,5-dithiolate (KDMcT) (0.1 mole) was dissolved in 200 ml of water at 20° C. Ammonium persulfate (25.1 g) was dissolved in 120 ml water. While vigorously stirring the KDMcT solution, the persulfate solution was added drop wise with a peristaltic pump over a period of 45 min. The solution was stirred an additional hour (solids formed during this period). The resulting PDTD product was washed 4× with 200 ml water. The solids were transferred to a Waring® blender, dispersed in 200 ml water and acidified with 0.1 M HCl to bring the pH to 2.0. The product was washed again with water (6×250 ml) and dried in a vacuum desiccator.

(c) Synthesis of poly[Zn:2,5-dimercapto-1,3,4-thiadiazole (1:1)], (n≥2) (VII)

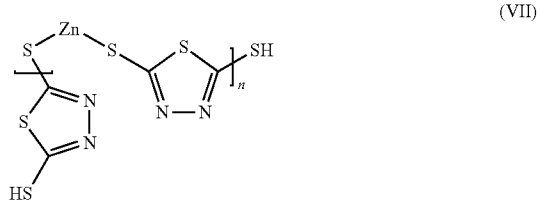

(VII)

Fifteen grams of DMcT (0.1 mole) was dispersed in 250 ml of water at 20° C. One hundred grams of 8% sodium hydroxide was slowly added with stirring. A clear yellow solution formed. Zinc chloride (13.6 grams (0.1 mole)) was dissolved in 100 ml water and slowly added to the yellow DMcT solution. The resulting solution was stirred one hour at room temperature. A white precipitate formed. The precipitate was washed with distilled water and vacuum dried for 16 hours at 80° C.

(d) Synthesis of [Al:2,5-dimercapto-1,3,4-thiadiazole (1:3)] (VIII)

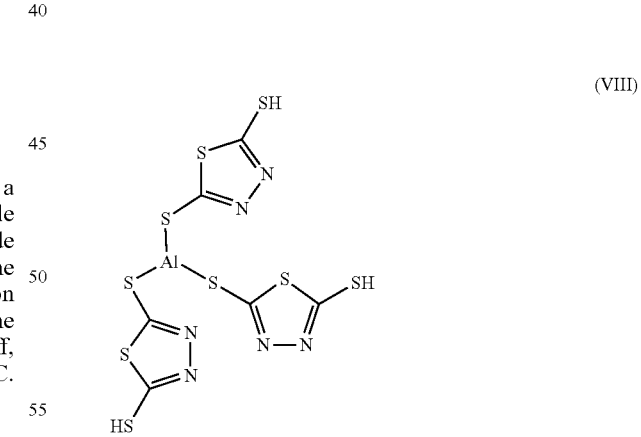

(VIII)

For [Al:2,5-dimercapto-1,3,4-thiadiazole (1:3)], 75 g of DMcT (0.5 mole) was dissolved in 1 liter of 1.0 N NaOH (1 mole). All of the DMcT dissolved to yield a clear amber-yellow solution. Aluminum nitrate nonahydrate (62.5 g (0.167 mole)) was slowly added to the DMcT solution with stirring at which time a light yellow colored precipitate immediately began to form. The resulting mixture, which has a DMcT to aluminum molar ratio of 3:1, was slowly stirred for 4 hours. The pH of the slurry, measured using a glass electrode, was determined to be 5.44. Using vacuum filtration, the slurry was filtered through Whatman® 1001 125 qualitative filter paper and washed 3 times with 250 ml portions of MilliQ® water. After air drying, 18.4 grams of yellow powder was recovered (Crop 1). The colorless filtrate had a pH of 5.49 (volume=1.25 liters). 50 ml of 3.8 M $H_2SO_4$ was added to the filtrate to bring the pH down to 1.26. During the addition of the acid, a cloudy precipitate formed. A slight "sulfur" odor was detected. This precipitate was vacuum filtered and washed 4 times with 100 ml MilliQ® water and air dried. 13.2 g of light yellow product was recovered (Crop 2).

The [Al:2,5-dimercapto-1,3,4-thiadiazole (1:3)] (acid) form was prepared in an identical manner except that the initial step of 75 g of DMcT (0.5 mole) being dissolved in 1 liter of 1.0 N NaOH (1 mole) was omitted. Instead, 75 g of DMcT (0.5 mole) was dissolved in 1 liter of water and reacted with 62.5 g (0.167 mole) of aluminum nitrate nonahydrate as described above.

(e) Synthesis of [Al:2,5-dimercapto-1,3,4-thiadiazole (3:1)] (IX)

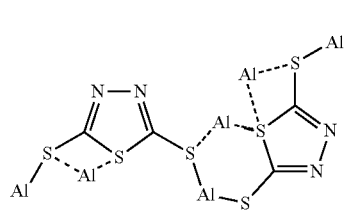

Fifteen grams (0.1 mole) of DMcT was dispersed in 250 ml of water at 20° C. One hundred grams of 8% sodium hydroxide was slowly added with stirring. A clear yellow solution formed. Aluminum nitrate nonahydrate (112.54 grams (0.3 mole)) was dissolved in 100 ml water and slowly added to the yellow DMcT solution. The resulting solution was stirred for one hour at room temperature. A solid precipitate formed that was washed 3× with DI water.

(f) Synthesis of poly[Zn:(bis-(2,5-dithio-1,3,4-thiadiazole) (1:1)], (n≥2) (X)

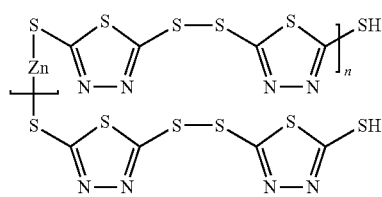

Vanlube 829 DMcT Dimer (Compound (II)) (59.6 g (0.2 mole)) was dispersed in 400 ml of 1.0M NaOH at ambient temperature with $N_2$ sparging. A cloudy yellow slurry formed. 27.2 grams (0.2 mole) of solid zinc chloride was dissolved in 200 ml of distilled water. The zinc chloride solution was slowly added to the cloudy yellow slurry. A pale yellow slurry immediately formed. The slurry was stirred overnight at room temperature with $N_2$ sparging. Using vacuum filtration, the slurry was filtered through a nylon filter membrane with 0.45 µm pores. The precipitate, Zn(Bis-DMcT), was washed 3× with 100 ml with distilled water and air dried before being placed in a vacuum desiccator overnight to complete drying.

(g) Synthesis of poly[Fe:2,5-dimercapto-1,3,4-thiadiazole) (1:1)], (n≥2) (XI)

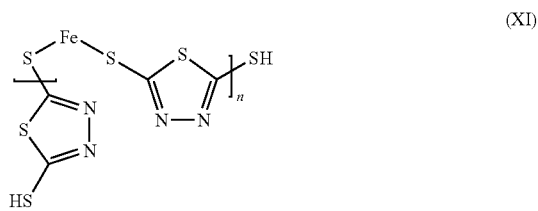

Fifteen grams (0.1 mole) of DMcT was dispersed in 250 ml of water at 20° C. One hundred grams of 8% sodium hydroxide was slowly added with stirring. A clear yellow solution formed. Twenty-seven grams (0.1 mole) of ferrous sulfate heptahydrate (FW=278.02) was dissolved in 100 ml water and slowly added to the yellow NaDMcT solution. The resulting solution was stirred for one hour at room temperature. A fine black precipitate formed. The precipitate was washed 3× with 100 ml of distilled water and vacuum dried at 80° C.

(h) Synthesis of poly[Al:2,5-dimercapto-1,3,4-thiadiazole (1:1)], (n≥2) (XII)

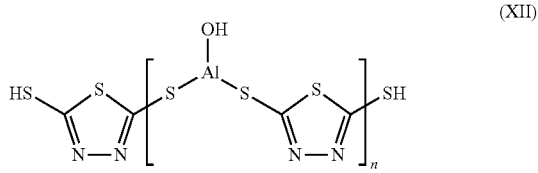

Fifteen grams (0.1 mole) of DMcT was dispersed in 250 ml of water at 20° C. One hundred grams of 8% sodium hydroxide was slowly added with stirring. A clear yellow solution formed. Aluminum nitrate nonahydrate (37.5 g (0.1 mole)) was dissolved in 100 ml water and slowly added to the yellow DMcT solution. The resulting solution was stirred for one hour at room temperature. A solid precipitate formed that was washed 3× with DI water and air dried to yield a powder.

(i) Synthesis of poly[Cu:2,5-dimercapto-1,3,4-thiadiazole (1:1)], (n≥2) (XIII)

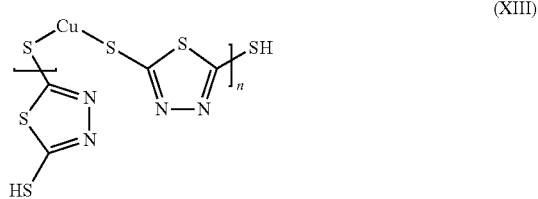

Fifteen grams (0.1 mole) of DMcT was dispersed in 250 ml of water at 20° C. One hundred grams of 8% sodium hydroxide was slowly added with stirring. A clear yellow solution formed. Copper (II) chloride dihydrate (17.0 g (0.1 mole)) was dissolved in 100 ml water and slowly added to the yellow DMcT solution. The resulting solution was stirred for one hour at room temperature. A white precipitate formed. The precipitate was washed with distilled water and vacuum dried for 16 hours at 80° C.

Example 4. Solubility Assessment of Thiadiazole Compounds (I)-(XIII) in Hydraulic Fluid Fifty milligrams (50 mg) of each solid form of thiadiazole compounds (I)-(XIII) was individually suspended in 10 g of hydraulic fluid (e.g., Skydrol® LD-4 (Eastman Chemical Co. (Kingsport, Tenn. [US])), though any phosphate ester hydraulic fluid is suitable). The individual suspensions were mixed using a vortex mixer for at least 30 sec under temperature conditions (e.g., 20° C.) and then visually inspected for the presence of solid particles. Compounds that formed non-cloudy solutions upon mixing were deemed to contain compounds being soluble or partially soluble in hydraulic fluid. Compounds that formed either cloudy dispersions or particulate sediment after mixing were deemed to contain compounds being insoluble in hydraulic fluid. Table 4 summarizes the solubility properties of Compounds (I)-(XIII) in hydraulic fluid.

TABLE 4

Solubility characteristics of thiol compounds in hydraulic fluid.

| Compound | Structure | Solubility in hydraulic fluid |
|---|---|---|
| I | 1,3,4-Thiadiazole-2,5-dithiol | Soluble |
| II | 5,5'-Dithiobis(1,3,4-Thiadiazole-2(3H)-thione) | Partially Soluble[a] |
| III | 1,2,4-Thiadiazole-3,5-dithiol | Insoluble |
| VI | 1,3,4-Thiadiazole-2,5-dithiol, dipotassium salt | Insoluble |
| IV | Bis-[2,5-dithio-1,3,4-thiadiazole] | Insoluble |

TABLE 4-continued

Solubility characteristics of thiol compounds in hydraulic fluid.

| Compound | Structure | Solubility in hydraulic fluid |
|---|---|---|
| V | poly-(2,5-dithio-1,3,4-thiadiazole), (n ≥ 2) | Insoluble |
| VII | poly[Zn:2,5-dimercapto-1,3,4-thiadiazole (1:1)], (n ≥ 2) | Insoluble |
| VIII | [Al:2,5-dimercapto-1,3,4-thiadiazole (1:3)] | Insoluble |
| IX | [Al:2,5-dimercapto-1,3,4-thiadiazole (3:1)] | Insoluble |
| X | poly[Zn:(bis-(2,5-dithio-1,3,4-thiadiazole) (1:1)], (n ≥ 2) | Insoluble |

TABLE 4-continued

Solubility characteristics of thiol compounds in hydraulic fluid.

| Compound | Structure | Solubility in hydraulic fluid |
|---|---|---|
| XI | poly[Fe:2,5-dimercapto-1,3,4-thiadiazole) (1:1)], (n ≥ 2) | Insoluble |
| XII | poly[Al:2,5-dimercapto-1,3,4-thiadiazole (1:1)], (n ≥ 2) | Insoluble |
| XIII | poly[Cu:2,5-dimercapto-1,3,4-thiadiazole (1:1)], (n ≥ 2) | Insoluble |

[a]Compound (II) initially formed a non-cloudy solution in hydraulic fluid; however, a sediment formed after 24-48 hours of incubation at ambient temperature.

Example 5. Demonstration of Removing Cu[II] Ions from Hydraulic Fluid with Thiol Resins Comprising Structure (1)

A 200 ml sample of a hydraulic fluid (e.g., Skydrol® LD-4 (Eastman Chemical Co. (Kingsport, Tenn. [US])), though any phosphate ester hydraulic fluid is suitable) was doped with copper (II) acetylacetate to a final concentration of 10 ppm copper (II) acetylacetate and contacted with 0.6 g of 2-mercaptoethyl ethyl sulfide silica (Sigma-Aldrich Co. LLC (St. Louis, Mo. [US])) or no silica compound. Ten ml aliquots were removed from each mixture over time and the copper concentration was measured using an Inductively Coupled Plasma Spectrometer (ICP). FIG. 3 illustrates the average remaining amount of Cu(II) in solution for aliquots (triplicates) taken at each indicated time point.

Example 6. Demonstration of Removing Cu[II] Ions from Hydraulic Fluid with Thiol Resins Comprising Thiol Compounds of Structure (2)

Copper (II) acetylacetate is added to a sample of hydraulic fluid (e.g., Skydrol® LD-4 (Eastman Chemical Co. (Kingsport, Tenn. [US])), though any phosphate ester hydraulic fluid is suitable) to provide a final concentration of about 10 ppm copper (II) acetylacetate in the fluid. The amount of copper (II) is measured in the solution using an Inductively Coupled Plasma Spectrometer (ICP). An equimolar amount of a thiol compound of structure (2) is added to a portion of the copper (II) acetate-hydraulic fluid solution and the solution-mixture is mixed using a vortex mixer for 1.5 minutes. The solution-mixture is allowed to stand for 24 hours and the copper (II) content present in the solution is measured using an Inductively Coupled Plasma Spectrometer (ICP). The amount of copper sequestered or complexed by the thiol compound is determined from the difference in the copper (II) concentrations before and after addition of the thiol compound.

Table 5 presents results of Copper (II) content in aliquots of hydraulic fluid (Skydrol® LD-4) containing copper (II) acetylacetate to a final concentration of about 10 ppm copper (II) acetylacetate and contacted with an equimolar amount of the indicated thiol compounds for 24 hours.

TABLE 5

Cu species concentration in hydraulic fluid before and after contact with exemplary thiol compounds of structure (2).

| Hydraulic fluid containing the indicated thiol compound of structure (2) | [Cu] (ppm) | |
|---|---|---|
| | T = 0 hr.[1] | T = 24 hr.[2] |
| Compound (I) | 10.8 | 7.9 |
| Compound (II) | 11.1 | 6.4 |
| Compound (V) | 10.2 | 8.7 |
| Compound (X) | 9.9 | 6.2 |

[1]The amount of copper (II) present in the hydraulic fluid before addition of the thiol compound is denoted by the "T = 0 hr."
[2]The amount of copper (II) present in the hydraulic fluid after 24 hr. contact with the thiol compound is denoted by the "T = 24 hr."

INCORPORATION BY REFERENCE

All publications, patents, and patent applications mentioned herein are hereby incorporated by reference in their entirety as if each individual publication, patent or patent application was specifically and individually indicated to be incorporated by reference. In case of conflict, the present application, including any definitions herein, will control.

While the present invention has been described with reference to certain aspects, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular aspects or examples disclosed, but that the present disclosure will include all aspects falling within the scope of the appended claims.

What is claimed is:

1. A system for removing copper species from a hydraulic fluid, the system comprising:
    a filter comprising a thiol resin,
       wherein the thiol resin comprises 2-mercaptoethyl ethyl sulfide silica beads, and
       wherein the filter is configured to be in fluid communication with the hydraulic fluid.
2. The system of claim 1, wherein the thiol resin further comprises at least one of a particle, a paper or a membrane, or combinations thereof.

3. The system of claim 1, wherein the filter further comprises a housing.

4. The system of claim 3, wherein the housing comprises an inlet and an outlet.

5. The system of claim 4, wherein the inlet and outlet are configured for fluid communication with the hydraulic fluid of the system.

6. The system of claim 1, wherein the thiol resin further comprises an inorganic support.

7. The system of claim 6, wherein the inorganic support further comprises $TiO_2$, $ZnO$, $Al_2O_3$, or combinations thereof.

8. The system of claim 1, wherein the 2-mercaptoethyl ethyl sulfide silica beads are nonporous.

* * * * *